United States Patent
Zuber et al.

(10) Patent No.: US 12,053,725 B2
(45) Date of Patent: Aug. 6, 2024

(54) PROCESS FOR DISTILLING A CRUDE COMPOSITION IN A RECTIFICATION PLANT INCLUDING AN INDIRECT HEAT PUMP

(71) Applicant: Sulzer Management AG, Winterthur (CH)

(72) Inventors: Laurent Zuber, Binningen (CH); Lin Feng Ni, Shanghai (CN)

(73) Assignee: SULZER MANAGEMENT AG, Winterthur (CH)

( * ) Notice: Subject to any disclaimer, the term of this patent is extended or adjusted under 35 U.S.C. 154(b) by 306 days.

(21) Appl. No.: 17/629,084

(22) PCT Filed: Jul. 6, 2020

(86) PCT No.: PCT/EP2020/069037
§ 371 (c)(1),
(2) Date: Jan. 21, 2022

(87) PCT Pub. No.: WO2021/013529
PCT Pub. Date: Jan. 28, 2021

(65) Prior Publication Data
US 2022/0288504 A1 Sep. 15, 2022

(30) Foreign Application Priority Data
Jul. 22, 2019 (EP) .................................. 19187599

(51) Int. Cl.
*B01D 3/00* (2006.01)
*B01D 3/14* (2006.01)
(Continued)

(52) U.S. Cl.
CPC ............. *B01D 3/322* (2013.01); *B01D 3/007* (2013.01); *B01D 3/148* (2013.01); *B01D 1/2856* (2013.01)

(58) Field of Classification Search
CPC ........ B01D 3/322; B01D 3/007; B01D 3/148; B01D 1/2856; B01D 3/14
See application file for complete search history.

(56) References Cited

U.S. PATENT DOCUMENTS

| 4,566,947 A * | 1/1986 | Tsuruta | ................ B01D 1/2856 |
| | | | 203/DIG. 19 |
| 7,935,844 B2 | 5/2011 | Bartos | |

(Continued)

FOREIGN PATENT DOCUMENTS

| CN | 2257739 Y | 7/1997 |
| CN | 101146758 A | 3/2008 |

(Continued)

OTHER PUBLICATIONS

Chinese Office Action issued Apr. 26, 2022 in corresponding Chinese Application No. 201911053225.2.

(Continued)

*Primary Examiner* — Renee Robinson
(74) *Attorney, Agent, or Firm* — GLOBAL IP COUNSELORS, LLP

(57) ABSTRACT

A process for purifying a crude composition comprising rectifying the crude composition in a rectification plant. The rectification plant comprises a rectification column including: a first overhead condenser for condensing a head fraction, and a reboiler for evaporating a bottom fraction. A difference between a temperature of the head fraction and a temperature of the bottom fraction is less than or equal to 20° C. A heat pump is provided between the first overhead condenser and the reboiler. The heat pump is an indirect heat pump that is operated with water or methanol as a refrigerant, and the indirect heat pump includes an expansion valve and a compressor. The heat pump comprises a second condenser located upstream of the compressor.

13 Claims, 1 Drawing Sheet

(51) Int. Cl.
    *B01D 3/32*     (2006.01)
    *B01D 1/28*     (2006.01)

(56) References Cited

U.S. PATENT DOCUMENTS

| | | | |
|---|---|---|---|
| 7,935,845 B2 | 5/2011 | Bartos et al. | |
| 8,173,834 B2 | 5/2012 | Bartos | |
| 8,323,457 B2 | 12/2012 | Townsend et al. | |
| 8,779,185 B2 | 7/2014 | Bartos | |
| 10,272,358 B2 | 4/2019 | Kishimoto et al. | |
| 2008/0097118 A1 | 4/2008 | Bartos et al. | |
| 2008/0194865 A1 | 8/2008 | Bartos | |
| 2009/0234156 A1 | 9/2009 | Bartos | |
| 2010/0108487 A1 | 5/2010 | Townsend | |
| 2012/0048719 A1* | 3/2012 | Nuernberg | B01D 3/146 |
| | | | 203/26 |
| 2012/0220800 A1 | 8/2012 | Bartos | |
| 2017/0036138 A1* | 2/2017 | Kishimoto | B01D 3/32 |
| 2018/0290073 A1* | 10/2018 | Brown | B01D 3/143 |

FOREIGN PATENT DOCUMENTS

| | | |
|---|---|---|
| CN | 102271774 A | 12/2011 |
| CN | 202554974 U | 11/2012 |
| CN | 106232197 A | 12/2016 |
| CN | 205759788 U | 12/2016 |
| CN | 109675333 A | 4/2019 |
| CN | 211536587 U | 9/2020 |
| WO | 2017207494 A1 | 12/2017 |
| WO | 2021013529 A1 | 1/2021 |

OTHER PUBLICATIONS

Chinese Search Report issued Apr. 21, 2022 in corresponding Chinese Application No. 201911053225.2.
Second Office Action issued Dec. 22, 2022 in corresponding Chinese Application No. 201911053225.2.
Taiwanese Office Action issued Aug. 22, 2023 in corresponding Taiwanese Application No. 109123735.
International Search Report issued Oct. 5, 2020 in corresponding International Application No. PCT/EP2020/069037.
European Search Report issued Jan. 23, 2020 in corresponding European Application No. 19187599.6.
International Preliminary Report on Patentability issued Jul. 8, 2021 in corresponding International Application No. PCT/EP2020/069037.

* cited by examiner

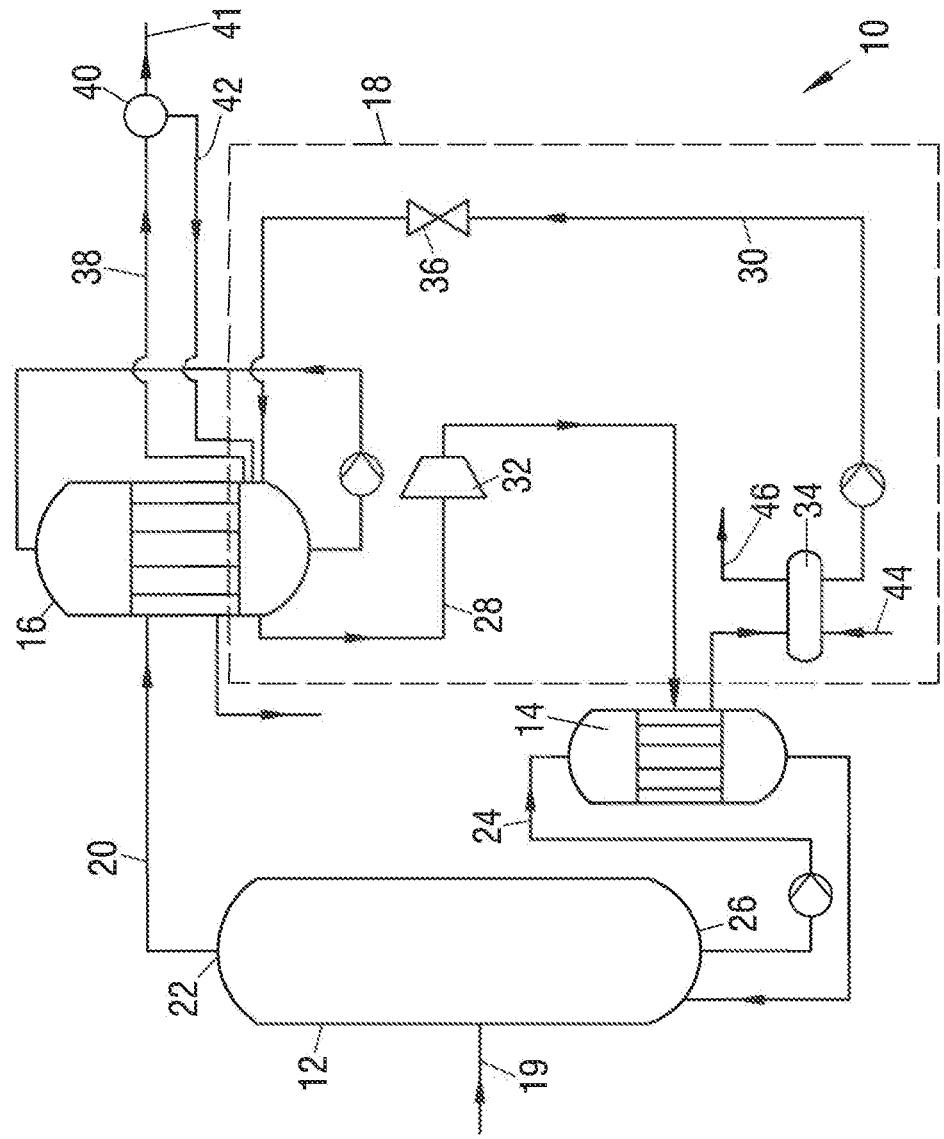

PROCESS FOR DISTILLING A CRUDE COMPOSITION IN A RECTIFICATION PLANT INCLUDING AN INDIRECT HEAT PUMP

CROSS-REFERENCE TO RELATED APPLICATIONS

This application is a U.S. National Stage application of International Application No. PCT/EP2020/069037, filed Jul. 6, 2020 which claims priority to European Patent Application No. 19187599.6, filed Jul. 22, 2019, the contents of each of which are hereby incorporated herein by reference.

BACKGROUND

Field of the Invention

The present invention relates to a process for purifying a crude composition comprising the distillation or rectification of the crude composition in a rectification plant comprising a heat pump operating between the overhead condenser and the reboiler of the rectification plant.

Background Information

Rectification is a well-known process of separating the components from a liquid mixture by means of selective boiling and condensation, which bases on the exploitation of differences in the volatility of the components of the mixture. Rectification is widely used for instance in the chemical and petrochemical industry. During the rectification, the liquid fraction collecting at the sump of the rectification column is continuously evaporated in a reboiler, whereas the vapor fraction collecting at the head of the rectification column is continuously condensed in a condenser.

In order to reduce the energy consumption of the process, i.e. in order to improve the energy balance of the process, it is sometimes possible to use a direct heat pump. In this arrangement part of the heat generated in the condenser during the condensation of the vapor head fraction is used for evaporating the liquid sump fraction in the reboiler. This may be achieved by withdrawing the vapor head fraction, by leading it to a compressor, in which it is compressed, and then leading it from the compressor to the reboiler, in which the compressed vapor head fraction condenses by transferring heat to the sump fraction, which is thereby evaporated. However, this process has the main disadvantage that the vapor head fraction has to enter into the compressor, which might result in a slight contamination of the vapor head fraction, i.e. the separated product of the rectification process. However, for a plurality of substances purified by rectification a very high degree of purity is required for the subsequent application of the substances. For instance silanes, such as methylchlorosilanes, in particular methyltrichlorosilane, are used in polymerization processes and need to be extremely pure to avoid potential problems with quality.

In order to avoid such disadvantages, it has been proposed to use an indirect heat pump. Such an indirect heat pump may be used in a similar way as found in refrigeration units and may be operated with ammonia or other chemicals as refrigerant. However, conventional refrigerants are expensive, especially considering the large inventory needed in large industrial systems, such as rectification plants. Moreover, the enthalpy of vaporization of the conventional refrigerants is rather low, which is the reason why rather large mass-flowrates have to be used. A further particular challenge is to economically realize such an indirect heat pump for rectification processes, while the difference between the bottom temperature and the head temperature of the rectification column, i.e. the difference between the dew point of the head fraction and the boiling point of the bottom fraction, is critical and must be rather low, such as in the case of the rectification of silanes, such as methylchlorosilanes, in particular methyltrichlorosilane.

In view of this, the object underlying the present invention is to provide a process for purifying a crude composition by rectification, which has a reduced energy need at the battery limit by making use of a heat pump between the vapor head fraction condenser and the sump fraction reboiler, which requires a rectification plant with comparable low investment costs, and which is particularly suitable for a rectification process, in which the difference between the bottom temperature and the head temperature of the rectification column is rather low, such as in the rectification of silanes, such as methylchlorosilanes, in particular methyltrichlorosilane, but which nevertheless leads to a rectification product with a very high degree of purity.

In accordance with an embodiment of the present invention, this object is satisfied by providing a process for purifying a crude composition comprising rectifying the crude composition in a rectification plant comprising a rectification column including: a first overhead condenser for condensing a head fraction and a reboiler for evaporating a bottom fraction, wherein a difference between a temperature of the head fraction and a temperature of the bottom fraction is less than or equal to 20° C., wherein a heat pump is provided between the first overhead condenser and the reboiler, the heat pump being an indirect heat pump that is operated with water or methanol as a refrigerant, the indirect heat pump including an expansion valve and a compressor, and wherein the heat pump comprises a second condenser located upstream of the compressor.

This solution is based on the surprising finding that by operating an indirect heat pump between the overhead condenser and the reboiler of a rectification plant and by using in the indirect heat pump water or methanol as a refrigerant, a process for purifying a crude composition is provided, which has a drastically reduced energy consumption. The process is particularly suitable for a rectification process, in which the difference between the bottom temperature and the head temperature of the rectification column is rather low, such as in the rectification of silanes, such as methylchlorosilanes, in particular methyltrichlorosilane, and which allows the obtention of a rectification product with a very high degree of purity since there is no contact between the rectification process streams, such as the vapor head fraction, and the fluids, such as refrigerant, of the heat pump. Therefore, in contrast to a direct heat pump, a contamination of the vapor head product in the compressor of the heat pump is reliably avoided, because the indirect heat pump is not operated with the vapor head product, but with a different refrigerant, namely with water or methanol. Since both water and methanol have a relatively high enthalpy of vaporization, relatively low mass-flowrates are sufficient in the heat pump so that a relatively compact and cost efficient heat pump may be used. On account of the same reason, the indirect heat pump operated with water or methanol is particularly suitable to be used for purifying a crude mixture in a rectification process, in which the difference between the temperature of the head fraction and the temperature of the bottom fraction is less than or equal to 20° C. Therefore, the process in accordance with an embodiment of the present invention is particularly suitable for purifying a crude composition, which includes as a component to be purified a silane, such as a methylchlorosilane, particularly methyltrichlorosilane. Moreover, the second condenser is a trim condenser that provides the required additional cooling so as to remove the energy excess resulting from the heat pump inherent efficiency. In the prior art, if present, the trim condenser is generally installed downstream of the compressor so as to increase the mean temperature difference with regard to the refrigerant and to thereby lower the needed surface area of the trim condenser. However, it has been found in the present invention that it is more economical to place the trim condenser upstream of the compressor instead of downstream of the compressor. Even if for the upstream arrangement a larger surface of the trim condenser is required, the flowrate of the vapor to be compressed in the trim condenser is significantly smaller so that the operating cost and thus the total costs of the rectification plant are reduced.

In accordance with the present invention, the term indirect heat pump means a heat pump in which a refrigerant is used, which does not derive from the rectification process, i.e. a heat pump in which no fraction obtained in the rectification process, such as the vapor head fraction, is used as a refrigerant.

Moreover, in accordance with the present invention, the term trim condenser means a condenser installed to complete the condensing duty after an overhead condenser or after the hot side of a reboiler. It is sometimes referred to in the literature as a "secondary condenser". Its size and duty are generally smaller than the primary (overhead) condenser. Its duty can be controlled to adjust or "trim" the pressure in the system. In the present invention, a large part of the trim condenser service is to remove the energy added in the system by the compressors. In order to clearly differentiate between the overhead condenser and the trim condenser, the overhead condenser is also referred to as a first condenser or first overhead condenser, whereas the trim condenser is referred to as a second condenser.

In accordance with an embodiment of the present invention, the indirect heat pump is operated with water or methanol as a refrigerant. The refrigerant preferably consists of water or methanol, i.e. does not contain any other substances with the exception of traces of absorbed gas.

Preferably, the indirect heat pump is operated with water. This is advantageous, because water is non-toxic and is furthermore suitable to be used for rectifications operating with temperatures in the range of 75 to 200° C.

The process in accordance with the present invention requires a high number of theoretical stages and thus must be realized in a long rectification column. Accordingly, the pressure drop in the column and the separation tasks suggests as such a large temperature difference between the top and the bottom of the rectification column. However, it has been surprisingly found in the present invention that this process is particularly suitable for rectifications with a difference between the temperature of the head fraction and the temperature of the bottom fraction of the rectification column of less than or equal to 20° C., more preferably of less than or equal to 15° C. and most preferably of less than or equal to 10° C.

In particular, the present invention is suitable to be used for a rectification in which the temperature of the bottom fraction or sump fraction, respectively, is 80° C. to 150° C., more preferably 85° C. to 105° C. and even more preferably 90 to 100° C.

It is proposed in accordance with a further embodiment of the present invention that during the process the temperature of the head fraction is at least 65° C. to 130° C., more preferably 75° C. to 95° C. and even more preferably 80 to 90° C.

As indicated above, the process of the present invention is particularly suitable and thus preferably used for purifying silanes, more preferably for purifying a methylchlorosilane and most preferably for purifying methyltrichlorosilane. The distillation of methyltricholorosilane requires very high purities, and the operating temperatures are in the range described above.

In order to easily couple the indirect heat pump with the rectification devices, it is particularly preferred that at least one and more preferably both of the overhead condenser and the reboiler are shell and tube apparatuses. This allows the indirect heat pump to be simply coupled with the overhead condenser and the reboiler, for instance by operating the tube side of the overhead condenser as well as the shell side of the reboiler with the refrigerant of the indirect heat pump, whereas the shell side of the overhead condenser is operated with the vapor head fraction of the rectification column and the tube side of the reboiler is operated with the bottom fraction of the rectification column.

Good results are in particular obtained when the overhead condenser is a shell and tube falling film evaporator. On the process side of the falling film evaporator, the vapor of the head fraction of the rectification is condensed, while on the utility side the heat transfer liquid, such as water or methanol, is evaporated. Thus, the top condenser is also an evaporator. The use of a falling film evaporator allows the operation with a lower temperature difference across the tubes than a conventional thermosiphon evaporator. However, the investment costs for the falling film evaporator and the capital expenditures therewith are slightly increased. However, the compression costs and the operating costs therewith are dramatically decreased thereby, so that in total the use of a falling film evaporator decreases the overall costs of the rectification plant used in the process in accordance with the present invention. Preferably, during the process the mean temperature difference between the shell side and the tube side of the falling film evaporator is between 2° C. and 25° C. and more preferably between 5° C. and 12° C.

Analogous thereto, it is particularly preferred that the reboiler at the bottom of the rectification column is a shell and tube falling film evaporator. Preferably, during the process the mean temperature difference between the shell side and the tube side of the reboiler is between 2° C. and 25° C. and more preferably between 5° C. and 12° C.

Preferably, the indirect heat pump comprises a vapor line, which connects the tube side of the overhead condenser with the shell side of the reboiler, and a condensate line, which connects the shell side of the reboiler with the tube side of the overhead condenser, wherein the vapor line comprises a compressor and the condensate line comprises an expansion valve.

In accordance with a further, particularly preferred embodiment of the present invention, the compressor of the indirect heat pump comprises one or more turbofans. Advantageously, the use of one or more turbofans allows the compressor costs to be significantly reduced, since they are much cheaper than the typically used turbo compressors. In dependency of the pressure ratio defined as pressure downstream of the compressor divided by pressure upstream of the compressor of the turbofan, two, three or more turbofans may be installed in series. Thus, preferably the compressor comprises 1 to 5 and more preferably 2 to 4 turbofans in series.

In accordance with an embodiment of the present invention, the heat pump comprises a second condenser, preferably a trim condenser, located upstream of the compressor. Preferably, the trim condenser is located in series with the overhead condenser.

It is proposed in a further embodiment of the idea of the present invention that the rectification plant comprises an inlet line and an outlet line, wherein the inlet line connects the tube side of the overhead condenser with the trim condenser and the outlet line connects the trim condenser with the tube side of the condenser such that remaining vapor is sent to and condensed in the trim condenser and condensate is sent back to the overhead condenser.

In accordance with a further particularly preferred embodiment of the present invention, small droplets of water or methanol are sprayed or injected, respectively, into the vapor flowing through the compressor so as to lower the temperature of the vapor after the compression. The compression leads to a superheating of the vapor downstream of the compressor, which is an issue for the reboiler, in particular if a falling film evaporator is used as the reboiler, which is not very efficient for the cooling superheated vapor. It is also preferable to run the vapor at a lower temperature as the cost of the compressor increases when it is engineered for a higher design temperature. Therefore, it is preferred to spray or inject, respectively, water or methanol, respectively, into the compressed vapor. The liquid temperature of the water or methanol, respectively, should be preferably at or close to its boiling point. The liquid water or methanol, respectively, sprayed or injected will then evaporate in the superheated vapor at higher temperature and thereby desuperheat the vapor. When operating the reboiler embodied as a falling film evaporator with a vapor that is closer to its dew point, the heat transfer is improved. Particularly preferably, the compressor comprises in this embodiment one or more turbofans.

During the startup of the process, it is advantageous to use steam in the reboiler for evaporating the bottom fraction of the rectification column. In particular, external steam can be used and the plant can be heated up before starting the compressor. In the case of a problem with the compressor, it is also possible to operate the rectification plant with steam heating the reboiler. The condensation may be at least partially ensured by the trim condenser. With an additional design reserve in the trim condenser, it is even possible to completely condense the top vapor when the compressor is not operating, such as in the case of maintenance.

A further embodiment of the present invention is a rectification plant comprising a rectification column, the rectification column comprising: an overhead condenser for condensing a head fraction, a reboiler for evaporating a bottom fraction and a heat pump operating between the overhead condenser and the reboiler, wherein the heat pump is an indirect heat pump that includes an expansion valve and a compressor, wherein the heat pump comprises a trim condenser located upstream of the compressor, an inlet line connecting the overhead condenser with the trim condenser and an outlet line connecting the trim condenser with the overhead condenser.

It is preferred that the compressor comprises one or more turbofans, more preferably 1 to 5 and most preferably 2 to 4 turbofans in series.

Moreover, it is preferred that the overhead condenser is a shell and tube falling film evaporator with the utility stream of the heat pump being on its tube side and that the reboiler for evaporating the bottom fraction is a shell and tube falling film evaporator with the utility stream of the heat pump being on its shell side.

BRIEF DESCRIPTION OF DRAWINGS

The invention will be explained in more detail hereinafter with reference to the drawings.

FIG. 1 shows a schematic view of a rectification plant for a process for purifying a crude composition in accordance with one embodiment of the present invention.

DETAILED DESCRIPTION

The sole FIG. 1 schematically shows a scheme of a rectification plant 10 for a process for purifying a crude composition in accordance with one embodiment of the present invention, in particular for purifying a silane, such as a methylchlorosilane, in particular methyltrichlorosilane.

The rectification plant 10 comprises a rectification column 12, a reboiler 14, an overhead vapor condenser 16 and an indirect heat pump 18. The rectification column 12 comprises a feed line 19 for feeding a crude silane mixture into the rectification column 12, a head line 20 connecting the head 22 of the rectification column 12 with the overhead vapor condenser 16, and a bottom line 24 connecting the sump 26 of the rectification column 12 with the reboiler 14. Both the reboiler 14 and the overhead vapor condenser 16 are shell and tube falling film apparatuses.

The indirect heat pump 18 comprises a vapor line 28, which connects the tube side of the overhead vapor condenser 16 with the shell side of the reboiler 14, and a condensate line 30, which connects the shell side of the reboiler 14 with the tube side of the overhead vapor 16. While a compressor 32 is arranged in the vapor line 28, a collection vessel 34 and an expansion valve 36 are arranged in the condensate line 30. The compressor 32 comprises two turbofans which are arranged in series. The collection vessel 34 comprises a line 44 for feeding a make-up stream and a vent line 46. In addition, the indirect heat pump 18 comprises an inlet line 38, a trim condenser 40 and an outlet line 42. The inlet line 38 connects the tube side of the overhead vapor condenser 16 with the trim condenser 40, and the outlet line 42 connects the trim condenser 40 with the tube side of the overhead vapor condenser 16.

During the operation of the rectification plant, a crude mixture including methyltrichlorosilane is fed via the feed line 19 into the rectification column 12, where it is distilled. The head fraction, i.e. vapor, enters via the head line 20 as heat input into the shell side of the overhead vapor condenser 16. Since the dew point of the vapor of the head fraction is higher than the boiling point of the liquid of the sump fraction pumped in the bottom line 24 from the sump of the rectification column 12 into the reboiler 14, an indirect heat transfer between the vapor of the head fraction in the overhead condenser 16 and the liquid of the bottom fraction in the reboiler 14 is possible so as to thereby evaporate the liquid of the bottom fraction by exploiting the heat of the vapor of the head fraction. Water as refrigerant of the heat pump 18 is evaporated in the tube side of the overhead condenser 16, since the boiling point of water is lower than the dew point of the vapor in the head line 20 coming from the head 22 of the rectification column 12. As a consequence, the water evaporates in the tube side of the overhead condenser 16. The liquid circulation on the tube side is ensured by a pump taking the liquid at the bottom of the tube side and circulating it back to the top of the tubes. The so formed vapor flows through the vapor line 28 to the compressor 32. Most of the vapor is sucked into the compressor 32. The compressor 32 compresses the vapor at a pressure that corresponds to the dew point temperature that is high enough to allow for its condensation on the shell side of the reboiler 14. The compression ratio—which is defined as pressure downstream the compressor divided by pressure upstream the compressor—is in this case between 1.70 and 3.20, and preferably between 2.10 and 2.70. The compression ratio is slightly smaller when choosing methanol instead of water as refrigerant and using the same temperature difference in the heat exchangers. The reboiler 14 and the overhead vapor condenser 16 have approximately the same absolute duty. Because the efficiency of the compressor 32 is lower than 100%, it is not necessary to compress all the vapor generated in the overhead vapor condenser 16. A portion of the energy is provided by the inefficiency of compressor 32 and is then carried in the vapor flowing through the vapor line 28. In order to transform some of the sensible heat into latent heat and ease the heat exchange on the shell side of the reboiler, water is injected into the compressor 32. The remaining vapor is removed in the trim condenser 40.

The compressed vapor is pumped into the shell side of the reboiler 14. Both the reboiler 14 and the overhead condenser 16 are shell and tube falling film apparatuses. The mean temperature difference between the shell side and the tube side of the overhead vapor condenser 16 on the one hand and the mean temperature difference between the shell side and the tube side of the reboiler 14 on the other hands are between 2° C. and 25° C. and preferably between 5° C. and 12° C. In the reboiler 14, heat is transferred from the vapor flowing in the shell side of the reboiler 14 to the liquid of the of the sump fraction flowing in the tube side of the reboiler 14, whereby the vapor condenses and the liquid of the sump fraction evaporates. On the tube side, the liquid of the rectification sump 26 is circulated by a pump through line 24 to top of the tubes in the reboiler 14. The condensate on the shell side is collected in the collection vessel 34. From there the liquid is pumped through the condensate line 30 and through the expansion valve 36 into the tube side of the overhead vapor condenser 16. Because the pressure on the tube side of the overhead vapor condenser 16 is lower than atmospheric pressure, some air leakage must be expected and the trim condenser 40 must be vented through line 41 to a vacuum unit. The thereby lost refrigerant is compensated by the make-up stream 44 fed into the collection vessel 34. The inert gases—mainly air leakage—which are included in the vapor pumped through the vapor line 28 and which are below atmospheric pressure will not condense in the shell side of the reboiler 14. Therefore, they need to be vented from the collection vessel 34 via the vent line 46.

The invention claimed is:

1. A process for purifying a crude composition comprising:
  rectifying the crude composition in a rectification plant comprising a rectification column including: a first overhead condenser for condensing a head fraction, and a reboiler for evaporating a bottom fraction, wherein:
  a difference between a temperature of the head fraction and a temperature of the bottom fraction is less than or equal to 20° C.,
  a heat pump is provided between the first overhead condenser and the reboiler, the heat pump being an indirect heat pump that is operated with water or methanol as a refrigerant, the indirect heat pump including an expansion valve and a compressor,
  the heat pump comprises a second condenser located upstream of the compressor,
  an inlet line connects a tube side of the first overhead condenser with the second condenser, and
  an outlet line connects the second condenser with the tube side of the first overhead condenser such that remaining vapor is sent to and condensed in the second condenser and condensate is sent back to the first overhead condenser.

2. The process in accordance with claim 1, wherein the difference between the temperature of the head fraction and the temperature of the bottom fraction is less than or equal to 15°C.

3. The process in accordance with claim 1, wherein the temperature of the bottom fraction is 80° ° C. to 150° ° C.

4. The process in accordance with claim 1, wherein the temperature of the head fraction is 65° ° C. to 130° C.

5. The process in accordance with claim 1, wherein the crude composition includes a silane as a component to be purified.

6. The process in accordance with claim 1, wherein the first overhead condenser is a shell and tube falling film evaporator.

7. The process in accordance with claim 1, wherein the reboiler is a shell and tube falling film evaporator.

8. The process in accordance with claim 1, wherein:
  the indirect heat pump comprises: a vapor line that connects a tube side of the first overhead condenser with a shell side of the reboiler, and a condensate line that connects the shell side of the reboiler with the tube side of the first overhead condenser, and
  the vapor line comprises the compressor and the condensate line comprises the expansion valve.

9. The process in accordance with claim 1, wherein the compressor comprises one or more turbofans.

10. The process in accordance with claim 1, wherein the compressor comprises one or more turbofans and droplets of water or methanol are sprayed into vapor flowing through the one or more turbofans so as to desuperheat the vapor.

11. A rectification plant comprising:
  a rectification column, the rectification column comprising:
  a first overhead condenser for condensing a head fraction;
  a reboiler for evaporating a bottom fraction; and
  a heat pump provided between the first overhead condenser and the reboiler, wherein:
  the heat pump is an indirect heat pump that includes an expansion valve and a compressor, and
  the heat pump comprises: a second condenser located upstream of the compressor, an inlet line connecting a tube side of the first overhead condenser with the second condenser, and an outlet line connecting the second condenser with the tube side of the first overhead condenser such that remaining vapor is sent to and condensed in the second condenser and condensate is sent back to the first overhead condenser.

12. The rectification plant in accordance with claim 11, wherein the compressor comprises one or more turbofans.

13. The rectification plant in accordance with claim 11, wherein the first overhead condenser is a first shell and tube falling film evaporator and the reboiler is another a second shell and tube falling film evaporator.

* * * * *